United States Patent [19]

Barrall

[11] Patent Number: 4,978,642
[45] Date of Patent: Dec. 18, 1990

[54] RIGID, WATER-RESISTANT PHOSPHATE CERAMIC MATERIALS HAVING ACOUSTIC CHANNELING AND PROCESSES FOR PREPARING THEM

[75] Inventor: Jeffery L. Barrall, Lancaster, Pa.

[73] Assignee: Armstrong World Industries, Inc., Lancaster, Pa.

[21] Appl. No.: 310,857

[22] Filed: Feb. 15, 1989

[51] Int. Cl.⁵ .............................................. C04B 38/00
[52] U.S. Cl. ........................................ 501/84; 501/85; 501/95; 501/111; 501/123
[58] Field of Search .................. 501/1, 84, 85, 95, 111, 501/123

[56] References Cited

U.S. PATENT DOCUMENTS

| | | | |
|---|---|---|---|
| 2,992,930 | 7/1961 | Wheeler et al. | 106/40 |
| 3,148,996 | 9/1964 | Vukasovich et al. | 106/87 |
| 3,330,675 | 7/1967 | Magder | 106/40 |
| 4,207,113 | 6/1980 | Yoshino et al. | 501/84 |
| 4,375,516 | 3/1983 | Barrall | 501/84 |
| 4,504,555 | 3/1985 | Prior et al. | 428/689 |
| 4,604,318 | 8/1986 | Prior et al. | 428/289 |
| 4,619,860 | 10/1986 | Brown et al. | 428/213 |

Primary Examiner—Mark L. Bell
Assistant Examiner—Chris Gallo

[57] ABSTRACT

This invention relates to a rigid, water-resistant phosphate ceramic product having improved acoustical properties; the components used to prepare the product; and its process of manufacture.

8 Claims, 1 Drawing Sheet

RIGID, WATER-RESISTANT PHOSPHATE CERAMIC MATERIALS HAVING ACOUSTIC CHANNELING AND PROCESSES FOR PREPARING THEM

The present invention relates to rigid, water-resistant phosphate ceramic materials and more particularly to rigid, water-resistant phosphate ceramic materials having acoustic channeling.

BACKGROUND OF THE INVENTION

Refractory metal phosphates have long been recognized as useful building and insulating materials. Compositions comprising phosphoric acid, a metal oxide and metal silicates are known in the art; however, compositions comprising these constituents and having adequate strength and acoustic properties are extremely difficult to prepare. For example, mixtures of aluminum oxide and 85% phosphoric acid are viscous and difficult to handle. If such mixtures are diluted With water, the ease of handling is greatly improved; however, when silicate, e.g. calcium silicate, is added and the resulting phosphate is thermally cured to drive off excess water, the refractory material obtained has relatively poor tensile strength and its acoustic properties are also poor.

The Prior Art

Various phosphate compositions and processes for preparing these materials are found in the prior art. For example, U.S. Pat. No. 2,992,930, dated July 18, 1961 to William Wheeler et al. discloses compositions positions comprising powdered zirconium or aluminum oxides, calcium silicate for foam stabilization, phosphoric acid. a silica sol bonding agent and a blowing agent, the composition being prepared by blending the dry ingredients, adding the silica sol stirring the mixture with phosphoric acid and allowing the resulting foam to become rigid.

U.S. Pat. No. 3,148,996, dated Sept. 15, 1964, to Mark Vukasovich et al. discloses compositions which set into a rigid mass Without heating and which may be rendered porous by incorporation of gas bubbles. These compositions consist of water, an acid phosphate consisting of phosphorous pentoxide and calcium, aluminum or zirconium oxides, and finely divided calcium silicate. They are formed by preparing a viscous solution of water, phosphor©us pentoxide and an appropriate metal oxide, adding calcium silicate to the mixture and allowing it to partially harden. Foaming is then induced by adding an internal foaming agent or by mechanically introducing gas bubbles.

U.S. Pat. No. 3,330,675, dated July 11, 1967 to Jules Magder discloses compositions comprising acidic aluminum phosphate, the carbonate, oxide, hydroxide or silicate of magnesium or zirconium, and organic or inorganic gas producing materials. Similarly, other patent references disclose related phosphate foams in which a poWdered metal is incorporated into the acidic mixture, thereby inducing foaming through the release of hydrogen gas.

A rigid, water-resistant phosphate ceramic material having adequate strength may be produced using the technology in U.S. Pat. No. 4,375,516, dated Mar. 1, 1983, in U.S. Pat. No. 4,504,555 dated Mar. 12, 1985 and in U.S Pat. No. 4,504,555 and 4,604,318 dated Mar. 12, 1985 and Aug. 5, 1986, respectively. However, there has been no teaching of how to alter the technology to obtain acceptable acoustic properties without any significant loss in the strength provided by the prior art technology.

Although it is evident from these references that substantial effort has been expended to develop useful phosphate foams, many problems still exist. Most of the prior art foams have poor bond strength, thereby rendering them unusable as building materials. Some are moisture sensitive. Many require heat curing to improve bond strength, and most contain other additives designed to circumvent weakness problems. In addition, as stated previously, most commerciallY manufactured foams suffer from poor acoustical properties.

Accordingly, one object of the present invention is to provide a strong, moisture-resistant phosphate ceramic material which can be prepared without the use of external heat and which displays improved acoustical properties, specifically a noise resistance coefficient (NRC) of at least 50, along with adequate strength properties.

SUMMARY OF THE INVENTION

The present invention involves a rigid, water-resistant phosphate ceramic material prepared from components comprising metal oxide, calcium silicate and phosphoric acid. By reacting an aluminum oxide with the phosphoric acid and adjusting the temperature of the acid solution when it is combined with the other ingredients, that include calcium silicate and magnesium oxide as the metal oxide, the character of the resulting product can be controlled to give a foamed phosphate ceramic material having improved acoustical properties.

DETAILED DESCRIPTION OF PREFERRED EMBODIMENTS

Figure 1:
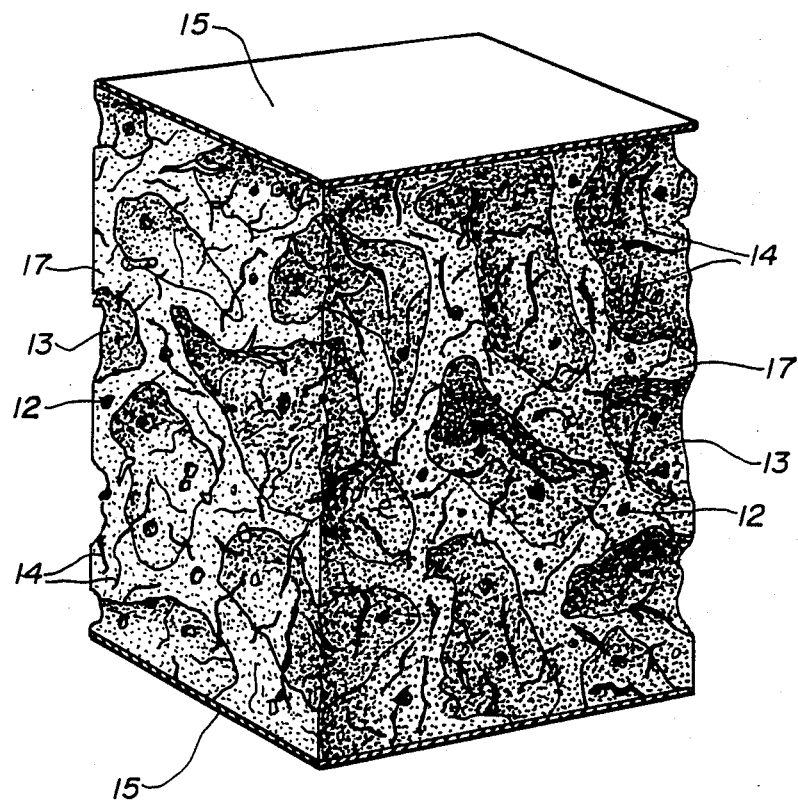

In one embodiment, the process of the present invention comprises the steps of (1) selecting $Al_2O_3$ or the hydrate thereof, the hydrate comprising a total of from about 5 to about 20 parts by weight, preferably about 8 to about 17 parts by weight; (2) preparing a reaction solution comprising said hydrate and from about 100 to about 125 parts by weight, preferably about 115 to about 122 parts of a phosphoric acid in a water solution comprising the equivalent of from about 40 to about 75% bY weight of phosphorous pentoxide based on the weight of the acid solution; and (3) preparing a mixture comprising about 15 to about 25, preferably about 17 to 22, parts by weight of magnesium oxide and about 100 parts by weight of calcium silicate. In step (4), the temperature of the reaction solution prepared in step (2) is adjusted to a desired value and the mixture prepared in step (3) is proportionally intermixed with said reaction solution. The resulting intermixed material is placed in a desired configuration in step (5) and the components are allowed to interact. The amount of the aluminum oxide hydrate used to prepare the reaction solution and the amount of magnesium oxide in the mixture are selected so that the ratio of $MgO: Al_2O_3.3H_2O$ is at least 1, preferably from about 1 to 2.

The components used to practice the present invention are all commercially available. Calcium silicate (100 parts by weight) is preferred in practicing the present invention although other calcium compounds may also give satisfactory results. Calcium silicate occurs naturally and is referred to as Wollastonite. Suitable foamed or unfoamed products can be obtained when this material is used in powdered form as described below. For making foams, the particle size will preferably be sufficiently small that most of the silicate passes through a 325-mesh Tyler Standard sieve.

A number of metal oxides may be used in the invention. Thus, although aluminum oxide hydrate is preferred in the reaction solution, calcium oxide or its hydrate may also be used to obtain satisfactory phosphate ceramic material. And although magnesium oxide is preferred in the substantiallY dry mixture, zinc oxide is a more expensive alternative. These oxides are preferably used in powdered form, with finer particle-size oxides on the order of 200-mesh (Tyler Standard) or smaller giving generally superior results. Hydrated forms of the oxide may also be used and in many instances are preferred. In the event that a hydrate is used, the water of hYdration must be taken into account so as not to provide excess water for the reaction. This may be conveniently done by including the water of hydration when calculating the phosphorous pentoxide content of the phosphoric acid solution.

From about 5 to about 20 parts by weight of the metal oxide hydrate (in relation to 100 parts of calcium silicate) may be used in the reaction solution and from about 15 to about 25 parts of metal oxide may be used in the relatively dry mixture with 100 parts of calcium silicate to practice the present invention. However, from about 7 to 22 parts of metal oxide hydrate in the solution and from about 8 to 17 parts of metal oxide in the mixture are preferred. The amount of oxide or hydrate that is used will depend on its reactivity and whether it is in the dry or hydrated form.

Phosphoric acid is available in a variety of concentrations, 85% being the most common concentration for ortho-phosphoric acid. Other compositions, such as polyphosphoric acid, which will yield phosphoric acid upon dilution with water may also be operable in the present invention, provided that the overall water content of the reaction system is not too high. Too much water must be avoided because products will be obtained which, even though water resistant, will have poor strength. On the other hand, too little water is also detrimental, not only because intermixing of the materials is difficult to achieve, but because, in the case of foamed products, onlY high density foams are obtained.

As a general rule, the phosphoric acid will be suitable if it contains the equivalent of from about 40 to about 75% by weight of phosphorous pentoxide based on the weight of the acid solution. Preferably, the equivalent of phosphorous pentoxide will be about 50-72%, and more preferably about 55-70%. The remaining portion of the acid solution comprises water including, for purposes of calculation, any water of hydration from the metal oxide. From about 100 to about 125 parts by weight of the acid solution may be used in practicing this invention but preferablY from about 115 to about 122 parts Will be used.

Although the components used to practice the present invention have long been used in the art, the advantages to be derived when these components are combined as disclosed herein have never been recognized until now. It has been discovered that if the ingredients for the reaction solution and for the dry mixture are judiciously selected, and if the manner in which the ingredients are combined is controlled and excess water is avoided, a product will be obtained which requires no heat curing, is water resistant and has surprisingly good acoustic properties. While applicant is not bound by any theory as to the nature of the reactions involved in the present invention, two separate yet related phenomena are apparently occurring; namely, vaporization of the water and bonding of the materials. Heat generated by the reactants vaporizes the Water present whereby the water vapor can act as a foaming agent. During approximately the same time span, bonding or setting occurs which results in the formation of a rigid ceramic-like material. These two phenomena will be referred to herein as "vaporization" or the "vaporization stage", and "setting" or the "setting stage", respectively.

To practice the present invention, a reaction solution is preferably prepared bY adding a desired portion of the aluminum and/or calcium oxide or hydrate of either or both oxides to the phosphoric acid solution. In addition, liquid additives such as surfactants may also be incorporated into the reaction solution. The magnesium or zinc oxide or both and the calcium silicate are then combined and mixed with any solid additives, such as reinforcing fibers, thickeners, coloring matter and the like. The temperature of the reaction solution is adjusted to a desired value and the solution is then proportionally mixed with the dry ingredients. The intermixed material is then placed in a desired configuration usuallY over an inert scrim material and the components of the system interact. The products which are obtained include the scrim material over its upper and lower surfaces and do not require heat curing and may be placed in boiling water without any adverse effect.

It has been discovered that the relative points in time at which vaporization and setting occur will dictate the nature of the product which is obtained. Specifically, for the present invention, it is important that setting occurs before the material has completed foaming so that the escaping water vapor forms intersitital channeling in the "semi-set" product. It is these interstitial channels that contribute to the excellent acoustical properties of the product.

The product obtained is a chemically bonded ceramic of unreacted fibers and particles of wollastonite with a number of large pores and channels. The magnesium oxide, aluminum oxide and the wollastonite (calcium silicate) react to form the binder phase. This binder phase is a calcium-aluminum-magnesium phosphate having the approximate formula $Ca_5Al_3MgH_6(PO_4)_9-.16H_2O$. Bound together are any unreacted wollastonite. fibers and particles as Well as amorphous silica resulting from loss of calcium ion to the binder phase. The chemically bonded ceramic is usually obtained between and adhered to two thin sheets of scrim material. The scrim material may be composed of a thin sheet of polymeric sheet fillers, e.g. polyester, polyamide or cellulosic fibers or a thin fiberglass sheet material. The latter is preferred because of its fire-resistance.

The product can be prepared to have a variety of different densities. Increasing stirring time tends to remove entrapped air and produces higher densities. The density can be decreased bY the addition of a carbonate salt, e.g. $MgCO_3$. Thus, densities from about 10 lbs/cu. ft. to as high as 68 lbs/cu. ft. or higher may be obtained. Preferred for the product of this invention are densities of 10 to about 25 lbs/cu. ft. with pores ranging from about 150 mils down to 10 mils in diameter with an extensive network of interconnecting channels to provide a noise resistance coefficent (NRC value) of at least 50 as measured on a $\frac{5}{8}''$-2" thick board according to ASTM C-423-84A. The preferred boards of this invention display an NRC value of 50-80 for a $\frac{5}{8}''$-1" thick board.

This invention Will be more clearly understood by referring to the drawing and the examples that follow. In the examples, all parts are expressed by weight unless otherwise noted.

FIG. 1 of the drawing is a sketch, in perspective, of the product of the invention.

The product is composed of a chemically bonded ceramic of unreacted fibers and particles of Wollastonite 12. With a number of large pores 13 and interconnecting channels 14 between two thin films or scrims shown at 15. The binder phase, composed of predominantly a complex phosphate of calcium (from the Wollastonite) and the metal ions of the oxides, is shown are 17.

Example 1

A phosphate foam was prepared from the following components:

|  | Wt. (g) | Parts per 100 parts CaSiO3 |
| --- | --- | --- |
| $Al_2O_3.3H_2O$ | 8.97 | 16.3 |
| 68% $H_3PO_4$ (49.3% $P_2O_5$) | 56.03 | 101.9 |
| $CaSiO_3$ | 55. | 100. |
| $MgCO_3$ | 4. | 7.3 |
| MgO | 10. | 18.2 |
| Ball clay | 4. | 7.3 |
| Talc filler | 4. | 7.3 |

The first component, the reaction solution was prepared at room temperature by adding 8.97 g. $Al_2O_3.3H_2O$ to 56.03 g. phosphoric acid solution. The resulting solution Was cooled to a temperature of 55° F.

The second component, the dry mixture of 4 g. MgO, 4 g. $MgCO_3$, 55 g. $CaSiO_3$, 4 g. talc and 4 g. ball clay Was continuously fed into a Readco continuous processor. Also fed to the processor through a separate port was the reaction solution at 55° F.

The two components, after being mixed in the processor, were continuously discharged as a slurry onto a moving belt Where the top and bottom surfaces of the slurry were coVered With thin fiberglass sheets as a scrim material. The fiberglass sheets were fed from tWo rolls placed above and beloW the moving belt. The slurry was leveled to a thickness of about 0.125 inch and expanded to about five (5) times its original thickness due to reaction of the components over a distance of about twenty (20) feet. The slurry solidified after about 3.5 minutes. Steam continued to evolve from the solidified sheet material over a period of about 3 0 seconds due to the exothermic reaction of the $CaSiO_3$, MgO and $MgCO_3$ reacting with the aluminum phosphate solution.

The final rigid foamed product displayed a density of 12 pounds per cubic foot: a compressive strength, as measured according to ASTM D-1621, of 90 psi; and a modulus of rupture, as measured according to ASTM C-209, of 55 psi With the facing fiberglass scrims removed and 205 psi with the facing material in place on both sides of the foamed sheet. Its NRC value (Noise Resistance Coefficient), as measured according to ASTM C-423-84A, was 65.

Control

A phosphate foam was prepared from the following components:

|  | Wt. (g) | Parts per 100 parts CaSiO3 |
| --- | --- | --- |
| $Al_2O_3.3H_2O$ | 8.97 | 17.94 |
| 68% $H_3PO_4$ (49.3% $P_2O_5$) | 56.03 | 112.06 |
| $CaSiO_3$ | 50. | 100. |
| $MgCO_3$ | 2. | 4. |
| MgO | 7. | 14. |
| Talc filler | 10. | 20. |

The first component, the reaction solution, was prepared at room temperature by adding 8.97 g. $Al_2O_3.3H_2O$ to 56.03 g. phosphoric acid solution with stirring. The resulting clear solution was cooled to 55° F.

The second component, the dry mixture of 7 g. MgO, 2 g. $MgCO_3$, 50 g. $CaSiO_3$ and 10 g. talc was continuously fed into a Readco continuous processor. The reaction solution at 55° F. Was also fed into the processor through a separate port.

The two components were mixed in the process or and discharged as a foaming slurry onto a moving belt covered With a scrim material. The slurry was leveled and it solidified in about 1.5 minutes. Steam continued to evolve from the solidified material over a period of about 30 seconds due to the exothermic reaction.

The final rigid foamed material had a fine cell structure and a density of 12 pounds per cubic feet. The compressive strength, measured according to ASTM D-1621, was 90 psi; and the modulus of rupture, as measured according to ASTM C-209, was 40 psi. It displayed an NRC value as measured according to ASTM C-423, of only 20.

What is claimed is:

1. A composition suitable to provide a rigid, water-resistant phosphate ceramic product having acoustic channeling sufficient to provide a noise resistance coefficient of at least 50, comprising 220-270 part of two components:

one component being from about 5 to 20 parts by weight-calculated as the hydrate of at least one oxide or hydrate selected from the group consisting of calcium oxide and aluminum oxide and their hydrates and from 100 to 125 parts by weight of phosphoric acid in a water solution; and a second component being from about 15 to 25 parts by weight of at least one oxide selected from the group consisting of magnesium oxide and zinc oxide, and about 100 parts by weight of calcium silicate, the ratio of the magnesium oxide and/or zinc oxide in the second component to the hydrate in the first component being greater than 1.

2. A composition of claim 1 Wherein the oxide in the first component is $Al_2O_3.3 H_2O$ and the oxide in the second component is magnesium oxide.

3. A composition of claim 2 wherein the first component comprises from 8 to 17 parts by weight of the $Al_2O_3.3H_2O$ and from 115 to 122 parts by weight of phosphoric acid.

4. A composition of claim 2 wherein the second component comprises from 17 to 22 parts by weight of magnesium oxide.

5. A composition of claim 3 wherein the second component comprises from 17 to 22 parts by weight 3 of magnesium oxide; and the ratio of $Al_2O_3.3H_2O$ to magnesium oxide is from 1 to 2.

6. A process for manufacturing a rigid, water-resistant phosphate ceramic product having a noise resistance coefficient of at least 50 comprising the steps of:
  (a) preparing a mixture of about 15 to 25 parts of at least one oxide from the group of magnesium oxide and zinc oxide and 100 parts of calcium silicate;
  (b) preparing a solution of about 5 to 20 parts of at least one oxide or hydrate, calculated as the hydrate, from the group of aluminum oxide and calcium oxide and their hydrates, in 100 to 125 parts of phosphoric acid in a water solution, the ratio of the MgO or ZnO in said mixture to the $Al_2O_3.3H_2O$ or calcium oxide hydrate in the solution being at least 1;
  (c) intermixing the mixture and the solution and placing the intermixed material in a desired configuration and allowing the components to react, the relative proportions of the components and the temperature of the solution being such that the intermixed material becomes sufficiently rigid prior to the time at which vaporization of the water is completed to provide a rigid water-resistant phosphate ceramic product having a noise resistance coefficient of at least 50.

7. A chemically bonded ceramic product consisting essentially of wollastonite fibers and particles bound by a phase having the formula $Ca_5Al_3MgH_6(PO_4)_9.16H_2O$, said product having pores and channels of such size and extent to provide a density of 10 to 68 lbs/cu ft and a noise resistance coefficient of at least 50 for a $\frac{5}{8}''-2''$ thick board.

8. A product as in claim 7 wherein the density is from 10 to 25 lbs/cu ft and its noise resistance coefficient is 50-80 for a $\frac{5}{8}''-1''$ thick board.

* * * * *